US011667390B2

(12) United States Patent
Stribrny et al.

(10) Patent No.: US 11,667,390 B2
(45) Date of Patent: Jun. 6, 2023

(54) SYSTEMS FOR AIRCRAFT LANDING AFTER EJECTION

(71) Applicant: AMI INDUSTRIES, INC., Colorado Springs, CO (US)

(72) Inventors: Casey A. Stribrny, Colorado Springs, CO (US); Nicholas K. Bharucha, Colorado Springs, CO (US); Steve Holstine, Colorado Springs, CO (US)

(73) Assignee: AMI INDUSTRIES, INC., Colorado Springs, CO (US)

( * ) Notice: Subject to any disclaimer, the term of this patent is extended or adjusted under 35 U.S.C. 154(b) by 348 days.

(21) Appl. No.: 17/079,293

(22) Filed: Oct. 23, 2020

(65) Prior Publication Data

US 2022/0127007 A1 Apr. 28, 2022

(51) Int. Cl.
*B64D 25/10* (2006.01)

(52) U.S. Cl.
CPC .................................... *B64D 25/10* (2013.01)

(58) Field of Classification Search
CPC ......... B64D 25/10; B64D 25/08; B64D 45/00
See application file for complete search history.

(56) References Cited

U.S. PATENT DOCUMENTS 3,796,398 A * 3/1974 Eilertson ................ B64D 17/80 244/902
6,382,563 B1 * 5/2002 Chiu ...................... B64D 25/12 244/140
7,234,667 B1 * 6/2007 Talmage, Jr. ......... B64C 39/024 244/120
10,467,913 B1 * 11/2019 Suiter .................... G08G 5/025
10,988,251 B2 * 4/2021 Georges ................. B64D 47/08
2013/0020435 A1 1/2013 Ufomata
2017/0297725 A1 10/2017 Campbell et al.

FOREIGN PATENT DOCUMENTS

EP 0182214 5/1986
EP 3647197 5/2020
IN 202011009262 A * 3/2020
IN 202011009262 A 3/2020

OTHER PUBLICATIONS

European Patent Office; Extended European Search Report dated Mar. 2, 2022 in Application No. 21204321.0.
"If pilot ejects, what is the autopilot programmed to do?" (stackexchange.com) Jun. 25, 2018; Hacker News; website accessed on Oct. 23, 2020 website: https://news.ycombinator.com/item?id=17391550.

* cited by examiner

*Primary Examiner* — Justin M Benedik
(74) *Attorney, Agent, or Firm* — Snell & Wilmer L.L.P.

(57) ABSTRACT

A system for controlling an aircraft in response to deployment of an ejection seat may comprise a seat controller located on the ejection seat and configured to output a signal in response to initiation of an ejection sequence. An aircraft controller may be configured to receive the signal from the seat controller. A tangible, non-transitory memory may be configured to communicate with the aircraft controller. The tangible, non-transitory memory may have instructions stored thereon that, in response to execution by the aircraft controller, cause the aircraft controller to perform operations, which may comprise receiving the signal from the seat controller, receiving data signals from an operational data source, and sending command signals configured to control a component of the aircraft.

20 Claims, 5 Drawing Sheets

SYSTEMS FOR AIRCRAFT LANDING AFTER EJECTION

FIELD

The present disclosure relates to ejection systems for aircraft and, more particularly, to systems for controlling aircraft landing in response to signals received from an ejection seat.

BACKGROUND

Certain aircraft may include ejection systems designed to eject the members of the flight crew from the aircraft in certain situations. These ejection systems typically include one or more ejection seat(s) in which the flight crew are located during flight. After the flight crew is ejected, the aircraft typically crashes as there is no one piloting the aircraft. The loss of aircraft is costly and can result in loss of life, depending on where the aircraft crashes.

SUMMARY

Disclosed herein is a system for controlling an aircraft in response to deployment of an ejection seat. The system may comprise a seat controller, an aircraft controller, and a first tangible, non-transitory memory. The seat controller may be located on the ejection seat and may be configured to output a signal in response to initiation of an ejection sequence. The aircraft controller may be configured to receive the signal from the seat controller. The first tangible, non-transitory memory may be configured to communicate with the aircraft controller. The first tangible, non-transitory memory may have instructions stored thereon that, in response to execution by the aircraft controller, cause the aircraft controller to perform operations, which may comprise: receiving, by the aircraft controller, the signal from the seat controller; receiving, by the aircraft controller, data signals from an operational data source; and sending, by the aircraft controller, a first set of command signals to a component of the aircraft.

In various embodiments, the operations may further comprise determining, by the aircraft controller, a desired landing destination. In various embodiments, determining, by the aircraft controller, the desired landing destination may comprise: determining, by the aircraft controller, a current location of the aircraft; accessing, by the aircraft controller, a database comprising information for a plurality of landing locations; and determining, by the aircraft controller, the desired landing destination based on the current location of the aircraft, the information for the plurality of landing locations, and the data signals from the operational data source.

In various embodiments, the first set of command signals may be configured to stabilize the aircraft. In various embodiments, the operations may further comprise sending, by the aircraft controller, a second set of commands to the component of the aircraft. The second set of commands may be configured to direct the aircraft to the desired landing destination.

In various embodiments, the operations may further comprise determining, by the aircraft controller, if a distance between the ejection seat and the aircraft is greater than a predetermined distance. The aircraft controller may be configured to begin sending the first set of command signals in response to determining the distance between the ejection seat and the aircraft is greater than the predetermined distance.

In various embodiments, determining, by the aircraft controller, if the distance between the ejection seat and the aircraft is greater than the predetermined distance may comprise outputting, by the aircraft controller, a plurality of wireless ping signals. In various embodiments, determining, by the aircraft controller, if the distance between the ejection seat and the aircraft is greater than the predetermined distance may comprise detecting, by the aircraft controller, severance of a cord connected to the ejection seat and the aircraft.

In various embodiments, the aircraft controller may be configured to send the first set of command signals a predetermined time delay after receiving the signal from the seat controller.

In various embodiments, a second tangible, non-transitory memory may be configured to communicate with the seat controller. The second tangible, non-transitory memory may have second instructions stored thereon that, in response to execution by the seat controller, cause the seat controller to perform second operations, which may comprise: receiving, by the seat controller, a sequence initiation signal; and outputting, by the seat controller, the signal to the aircraft controller in response to receiving the sequence initiation signal. In various embodiments, the sequence initiation signal may be output in response to actuation of a rail switch.

A ejection system is also disclosed herein. In accordance with various embodiments, the ejection system may comprise an ejection seat configured to be expelled from an aircraft, a seat controller coupled to the ejection seat and configured to output a signal in response to initiation of an ejection sequence, and an aircraft controller configured to receive the signal from the seat controller. The aircraft controller may be configured to control the aircraft in response to receiving the signal from the seat controller.

In various embodiments, a drogue may be coupled to the ejection seat, a main parachute may be configured to deploy from the ejection seat, and an ejection sequencer may be operationally coupled to the drogue and the main parachute. The ejection sequencer may include the seat controller, and the seat controller may be configured to control a deployment sequence for the drogue and the main parachute.

In various embodiments, the aircraft controller may be configured to determine if a distance between the ejection seat and the aircraft is greater than a predetermined distance. The aircraft controller may be configured to begin sending command signals configured to control a component of the aircraft in response to determining the distance between the ejection seat and the aircraft is greater than the predetermined distance.

A method for controlling an aircraft after deployment of an ejection seat from the aircraft is also disclosed herein. In accordance with various embodiments, the method may comprise receiving, by an aircraft controller, a signal from a seat controller coupled to the ejection seat; receiving, by the aircraft controller, data signals from an operational data source; and sending, by the aircraft controller, a first set of command signals to a component of the aircraft. The operational data source may be configured to monitor at least one of an engine operating condition, an aircraft operating condition, or a flight parameter. The first set of command signals may be configured to control at least one of the engine operating condition or the aircraft operating condition.

In various embodiments, the method may further comprise determining, by the aircraft controller, a desired landing destination. In various embodiments, determining, by the aircraft controller, the desired landing destination may comprise: determining, by the aircraft controller, a current location of the aircraft; accessing, by the aircraft controller, a database comprising information for a plurality of landing locations; and determining, by the aircraft controller, the desired landing destination based on the current location of the aircraft, the information for the plurality of landing locations, and the data signals from the operational data source.

In various embodiments, the method may further comprise sending, by the aircraft controller, a second set of commands to the component of the aircraft. The first set of command signals may be configured to stabilize the aircraft, and the second set of commands may be configured to direct the aircraft to the desired landing destination.

In various embodiments, the method may further comprise determining, by the aircraft controller, if a distance between the ejection seat and the aircraft is greater than a predetermined distance. The aircraft controller may be configured to begin sending the first set of command signals in response to determining the distance between the ejection seat and the aircraft is greater than the predetermined distance.

In various embodiments, the method may further comprise receiving, by the seat controller, a sequence initiation signal; and outputting, by the seat controller, the signal to the aircraft controller in response to receiving the sequence initiation signal. The sequence initiation signal may be output in response to actuation of a rail switch.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Figure 1:
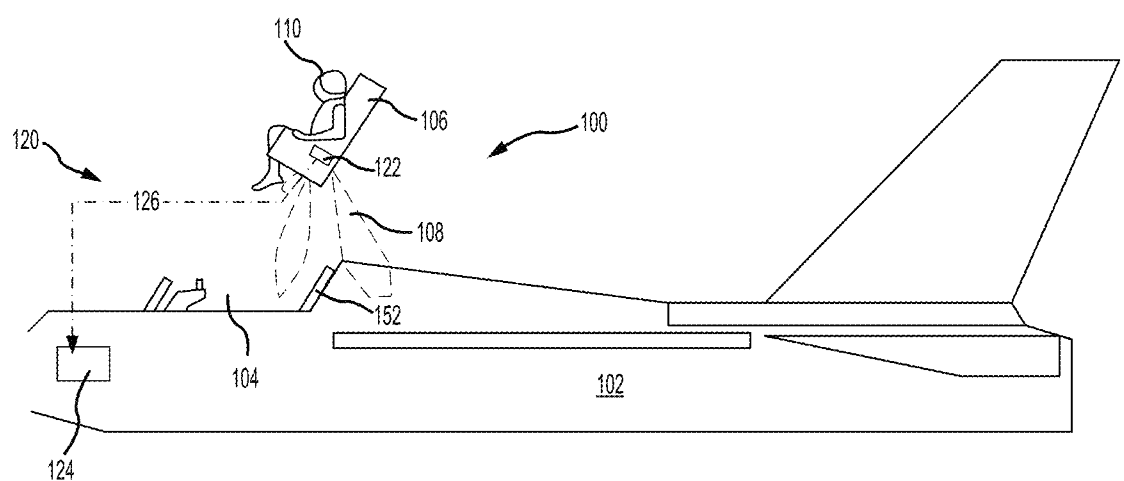
FIG. 1 illustrates an ejection seat being launched from an aircraft cockpit, in accordance with various embodiments.

Referring now to FIG. 1, an aircraft ejection system 100 is shown, in accordance with various embodiments. Aircraft ejection system 100 may be installed in aircraft 102 to safely expel ejection seat 106 and an occupant 110 of ejection seat 106 from cockpit 104 of aircraft 102. Ejection seat 106 may be urged from cockpit 104 by a propulsion system 108. Aircraft 102 may be a passenger aircraft, a cargo aircraft, a military aircraft, or the like. As described in further detail below, ejection system 100 may include a seat-aircraft communication system 120. Seat-aircraft communication system 120 may be configured to allow for control of aircraft 102 in response to deployment of ejection seat 106. In accordance with various embodiments, seat-aircraft communication system 120 includes a seat controller 122 and an aircraft controller 124. Seat controller 122 may be configured to send a signal 126, to aircraft controller 124, indicating ejection seat 106 has been ejected from cockpit 104. In accordance with various embodiments, aircraft controller 124 is configured to take control of aircraft 102 in response to receiving signal 126. For example, aircraft controller 124 may begin controlling (e.g., sending commands to) the engines, throttle, landing gear, and/or any other component(s) of aircraft 102, in response to receiving signal 126.

Figure 2:
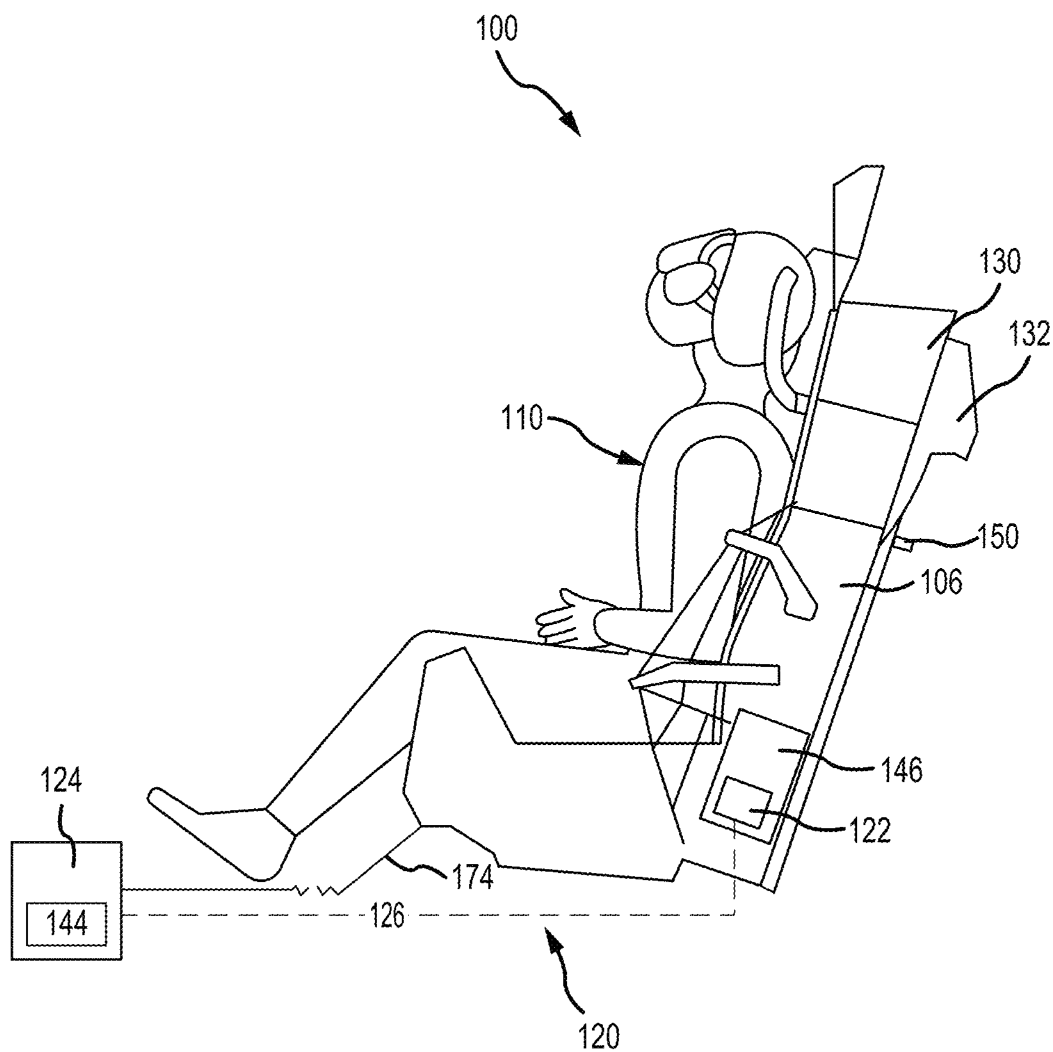
FIG. 2 illustrates an ejection system including a seat-aircraft communication system for controlling an aircraft in response to deployment of an ejection seat, in accordance with various embodiments.

Referring now to FIG. 2, additional details of ejection system 100 are illustrated, in accordance with various embodiments. Ejection seat 106 of ejection system 100 may include a main parachute 130 and a drogue 132. Ejection seat 106 may further include a catapult or rocket that expels ejection seat 106 and the occupant 110 thereof from the cockpit 104 (FIG. 1). The drogue 132 may be a parachute that initially deploys upon ejection of ejection seat 106. Drogue 132 may reduce a velocity of ejection seat 106 or otherwise stabilize ejection seat 106 upon ejection. Main parachute 130 may deploy after the drogue 132. In various embodiments, main parachute 130 deploys during separation of occupant 110 from ejection seat 106. Main parachute 130 may provide reduction in the velocity for occupant 110 as he/she travels towards the ground surface.

Figure 3:
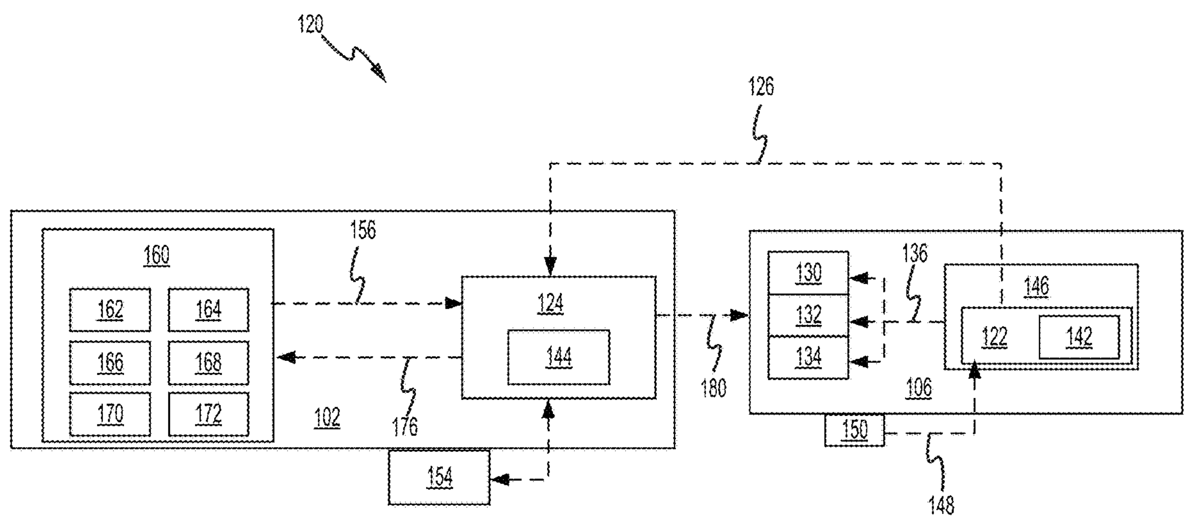
FIG. 3 illustrates a schematic a seat-aircraft communication system for controlling an aircraft in response to deployment of an ejection seat, in accordance with various embodiments.

FIG. 3 shows a schematic of seat-aircraft communication system 120. With combined reference to FIG. 2 and FIG. 3, in accordance with various embodiments, seat-aircraft communication system 120 includes seat controller 122. Seat controller 122 may be located on ejection seat 106. Seat controller 122 may include one or more logic devices such as one or more of a central processing unit (CPU), an accelerated processing unit (APU), a digital signal processor (DSP), a field programmable gate array (FPGA), an application specific integrated circuit (ASIC), or the like. Seat controller 122 may further include any tangible, non-transitory memory 142 known in the art. The memory 142 may have instructions stored thereon that, in response to execution by seat controller 122, cause seat controller 122 to perform various operations related to the ejection of seat 106.

In various embodiments, seat controller 122 may be included on an ejection sequencer 146 of ejection seat 106. Ejection sequencer 146 and seat controller 122 may control the sequence (i.e., timing) for deploying various components of ejection system 100. For example, ejection sequencer 146 and seat controller 122 may control the firing (i.e., deployment) of drogue 132, main parachute 130, a harness release 134, and/or other ejection system components on ejection seat 106. In this regard, in various embodiments, seat controller 122 may be configured to send signal 126 to aircraft controller 124 and to send firing commands 136 to drogue 132, main parachute 130, harness release 134, and/or other ejection system components on ejection seat 106.

In accordance with various embodiments, seat controller 122 sends signal 126 (and in various embodiments, commands 136) in response to receiving a sequence initiation signal 148. Sequence initiation signal 148 may be output in response to an actuation (or "flipping") of one or more rail switch(es) 150. Rail switch(es) 150 may be actuated, and sequence initiation signal 148 may be output to seat controller 122, in response to ejection seat 106 translating along rails 152 in cockpit 104, with momentary reference to FIG. 1. While sequence initiation signal 148 is described as being sent in response to actuation of rail switch 150, it is contemplated and understood that sequence initiation signal 148 may be sent in response to other event(s) indicating the expulsion of ejection seat 106 from cockpit 104 has begun.

The seat-aircraft communication system 120 further includes aircraft controller 124. Aircraft controller 124 may be located on aircraft 102. Seat controller 122 is in communication with aircraft controller 124. Seat controller 122 may communicate with aircraft controller 124 via a wireless protocol such as an 802.11a/b/g/n/ac signal (e.g., Wi-Fi), a wireless communications protocol using short wavelength UHF radio waves and defined at least in part by IEEE 802.15.1 (e.g., the BLUETOOTH protocol maintained by Bluetooth Special Interest Group), a wireless communications protocol defined at least in part by IEEE 802.15.4 (e.g., the ZigBee protocol maintained by the ZigBee alliance), a cellular protocol, an infrared protocol, an optical protocol, a RFID protocol, a NFC protocol, or any other protocol capable of wireless transmissions.

Aircraft controller 124 may include one or more logic devices such as one or more of a CPU, an APU, a DSP, a FPGA, an ASIC, or the like. Aircraft controller 124 may further include any tangible, non-transitory memory 144 known in the art. The memory 144 may store instructions usable by the logic device to perform operations configured to allow aircraft controller 124 to control aircraft 102. For example, in response to receiving signal 126, aircraft controller 124 may begin receiving and interpreting information and data related to the operating conditions of aircraft 102, the flight information (e.g., take-off and/or landing sites) for aircraft 102, environmental conditions, or any other information related to the aircraft 102. In response to receiving signal 126, aircraft controller 124 may also begin sending commands to various components of aircraft 102.

Aircraft controller 124 may receive data signals 156 from one or more operational data source(s) 160. Data signals 156 may be output from one or more gas turbine engine(s) 162 of aircraft 102, avionics units 164, flight management systems 166, sensors 168, automatic throttle systems 170, landing gear system(s) 172, or other engine, aircraft, and/or flight data sources. Stated differently, aircraft controller 124 may be in logical and/or electronic communication with operational data sources 160. In this regard, aircraft controller 124 may receive data signals 156 from one or more gas turbine engine(s) 162 of aircraft 102, avionics units 164, flight management systems 166, sensors 168, automatic throttle systems 170, landing gear system(s) 172, or other engine, aircraft, and/or flight data sources. For example, aircraft controller 124 may receive data signals 156 correlating to altitude, aircraft speed, flight time, Mach number, rotational speeds of the low pressure and high pressure spools of the gas turbine engines, fuel output, global position system (GPS) information, landing gear position, or any other operating information related to aircraft 102. Data signals 156 may be sent to aircraft controller 124 as a voltage signal, a current signal, a digital signal, or any other suitable signal, whether filtered, conditioned, or otherwise preprocessed.

Aircraft controller 124 may be configured to begin outputting commands 176 configured to control various components of aircraft 102 (e.g., gas turbine engine(s) 162, avionics units 164, flight management systems 166, sensors 168, automatic throttle systems 170, landing gear system(s) 172, etc.), in response to receiving signal 126 and data signals 156. In this regard, aircraft controller 124 may directly control various components of aircraft 102 and/or may provide instructions to components and those components may control the flight and/or landing operations of aircraft 102.

In various embodiments, aircraft controller 124 may be configured to send commands 176 configured to stabilize aircraft 102. Prior to sending commands 176, aircraft controller 124 may confirm that ejection seat 106 is a sufficient (i.e., predetermined) distance away from aircraft 102. Determining ejection seat 106 is a safe distance away from aircraft 102 reduces a probability that the stabilization maneuver(s) (e.g., a roll) could impact ejection seat 106. In various embodiments, aircraft controller 124 may begin sending ping signals 180 to ejection seat 106, in response to receiving signal 126. The ping signals 180 may be configured to detect if ejection seat 106 is within a predetermined distance of aircraft 102. Ping signals 180 may sent via a wireless protocol such as an 802.11a/b/g/n/ac signal (e.g., Wi-Fi), a wireless communications protocol using short wavelength UHF radio waves and defined at least in part by IEEE 802.15.1 (e.g., the BLUETOOTH protocol maintained by Bluetooth Special Interest Group), a wireless communications protocol defined at least in part by IEEE 802.15.4 (e.g., the ZigBee protocol maintained by the ZigBee alliance), a cellular protocol, an infrared protocol, an optical protocol, a RFID protocol, a NFC protocol, or any other protocol capable of wireless transmissions. In response to the ping signals 180 indicating ejection seat 106 is outside the predetermined distance (i.e., a distance between ejection seat 106 and aircraft 102 is greater than the predetermined distance), the aircraft controller 124 may begin sending commands 176.

While detection of ejection seat 106 is described with reference to wireless ping signals 180, it is contemplated and understood that any system and/or method for determining that ejection seat 106 is at least a predetermined distance from aircraft 102 may be employed by system 120. For example, in various embodiments, a cord 174 may be connected between ejection seat 106 and aircraft 102. Cord 174 may be configured to sever in response to the ejection seat 106 traveling past the predetermined distance from aircraft 102. Aircraft controller 124 may be configured to detect severance of cord 174 and may begin sending commands 176 in response to severance of cord 174. In various embodiments, aircraft controller 124 may start a timer in response to receiving signal 126 from seat controller 122. Aircraft controller 124 may be configured to begin sending commands 176 a predetermined time delay after receiving signal 126. The predetermined time delay is configured to allow ejection seat 106 to travel at least the predetermined distance, before aircraft controller 124 begins sending commands 176.

In various embodiments, after stabilization of aircraft 102, aircraft controller 124 may direct aircraft 102 to a landing location. In various embodiments, aircraft controller 124 may communicate with a database or remote memory 154. The database 154 may be located on a same aircraft as the aircraft controller 124 or may be located remote from the aircraft controller 124. The aircraft controller 124 may communicate with the database 154 via any wired or wireless protocol. In that regard, the aircraft controller 124 may access data stored in the database 154. The database 154 may store information regarding the flight plan and intended landing location (e.g., airport, military base, aircraft carrier, etc.) for aircraft 102. For example, database 154 may include GPS, latitudes, longitudes, or other location information related to the intended landing location of aircraft 102. Database 154 may also store GPS, latitudes, longitudes, or other location information related to landing locations (e.g., airports, military bases, etc.) other than intended landing location of aircraft 102.

Aircraft controller 124 may begin accessing the landing location information located on database 154 in response to receiving signal 126 and/or in response to stabilizing aircraft 102. Aircraft controller 124 may be configured to analyze information from database 154 along with data signals 156 and determine where to direct aircraft 102. In various embodiments, aircraft controller 124 may determine where to direct aircraft 102 based on a current location of aircraft 102 (e.g., a GPS signal) and/or one or more operating parameters of aircraft 102. For example, aircraft controller 124 may determine where to land aircraft 102 based on fuel measurements, engine health status, landing gear health status, or any other available data. In various embodiments, aircraft controller 124 may be configured to first determine whether aircraft 102 can be flown back to the flight plan landing location (i.e., the location to where the crew member (i.e. occupant 110) would have flown and landing aircraft 102 had he/she not been ejected). Aircraft controller 124 will fly aircraft 102 to the flight plan landing location, if aircraft controller 124 determines aircraft 102 can safely make it to the flight plan landing location. If aircraft controller 124 determines that based on, for example, the current fuel levels or health of aircraft 102 that aircraft 102 cannot make it back to the flight plan landing location, aircraft controller 124 may determine the closest available landing location based on information stored within database 154.

In various embodiments, if based on data signals 156, aircraft controller 124 determines the aircraft 102 cannot reach a landing location stored within database 154, aircraft controller 124 may determine where to land aircraft 102 based on data signals received from radar, sonar, optical, infrared, or other sensors. For example, aircraft controller 124 may be configured to identify an area, such as a field, road, or other clearance, where aircraft 102 can be landed safely. In various embodiments, if based on information from database 154 and/or from data signals 156, aircraft controller 124 determines that it is not desirable to land aircraft 102 safely (e.g., if aircraft 102 cannot make it out of enemy territory or if aircraft 102 cannot be safely recovered), aircraft controller 124 may determine to crash or otherwise self-destruct aircraft 102.

Figure 4A:
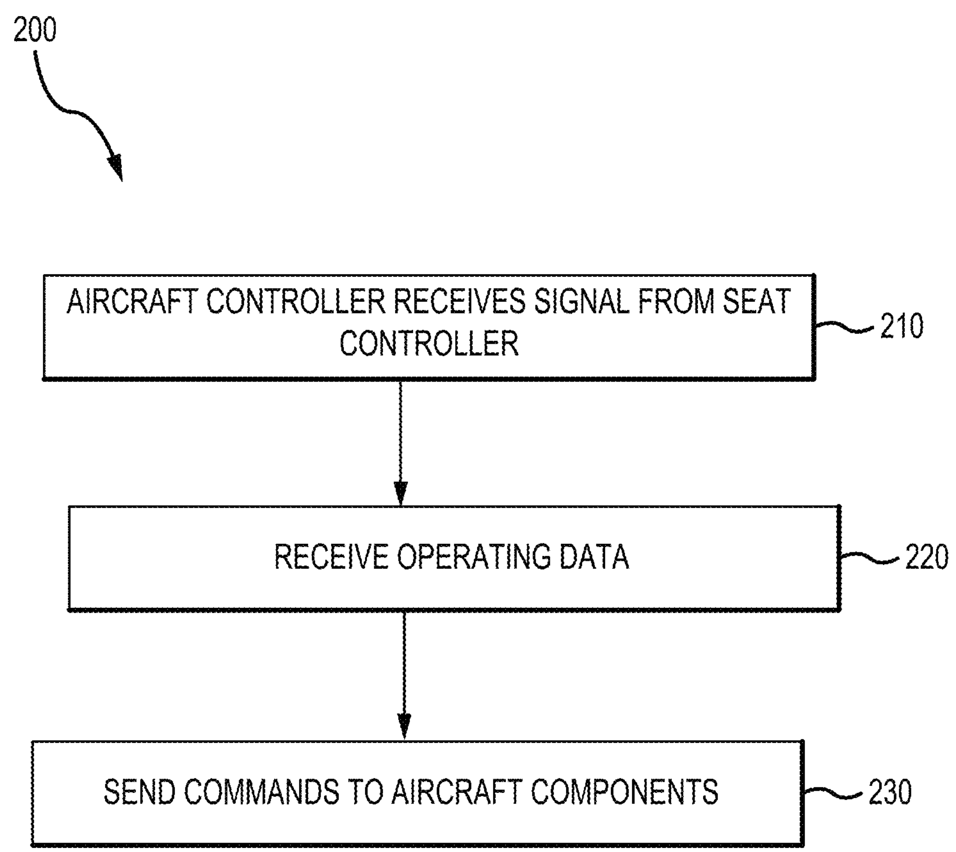
FIGS. 4A and 4B illustrate a method for controlling an aircraft in response to deployment of an ejection seat, in accordance with various embodiments.

Referring now to FIG. 4A, a method 200 for controlling an aircraft after deployment of an ejection seat from the aircraft is illustrated. The method 200 may be performed by components of a system similar to the system 120 of FIGS. 1, 2, and 3. Method 200 may include receiving, by an aircraft controller, a signal from a seat controller coupled to the ejection seat (step 210) and receiving, by the aircraft controller, data signals from an operational data source (step 220). The operational data source may be configured to determine at least one of an engine operating condition, an aircraft operating condition, or a flight parameter. Method 200 may further include sending, by the aircraft controller, a command signal to a component of the aircraft (step 230). The command signal may be configured to control at least one of the engine operating condition or the aircraft operating condition.

Figure 4B:
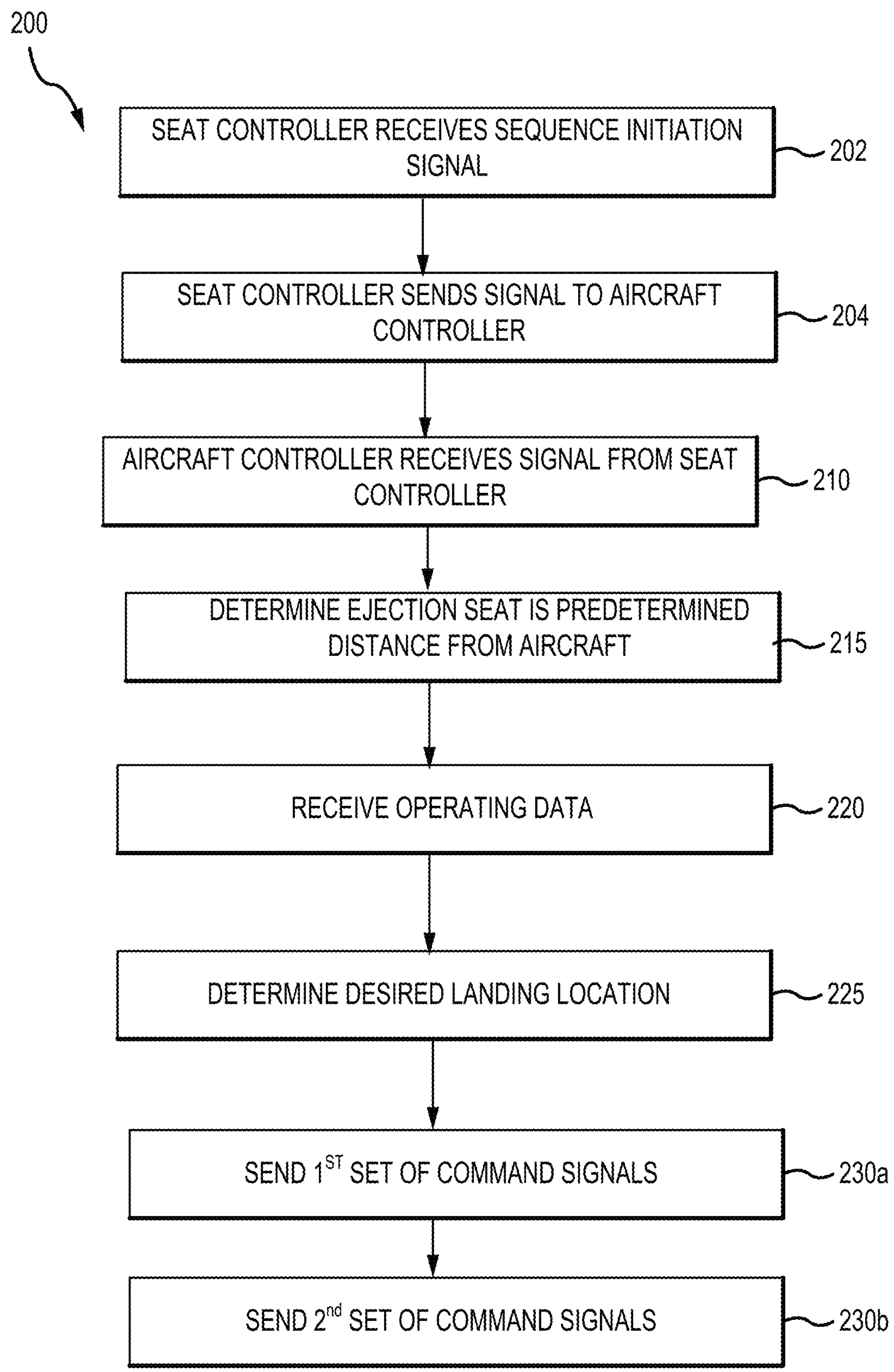

Referring now to FIG. 4B, in various embodiments, method 200 may further include receiving, by the seat controller, a sequence initiation signal (step 202). In various embodiments, the sequence initiation signal is output in response to actuation of a rail switch. Method 200 may further include outputting, by the seat controller, the signal to the aircraft controller in response to receiving the sequence initiation signal (step 204).

In various embodiments, method 200 may further include determining, by the aircraft controller, if a distance between the ejection seat and the aircraft is greater than a predetermined distance (step 215). In various embodiments, method 200 may further include determining, by the aircraft controller, a desired landing destination (step 225). In various embodiments, step 230 may include sending a first set of commands (step 230*a*) and sending a second set of commands (step 230*b*). The first set of command signals may be configured to stabilize the aircraft, and the second set of commands may be configured to direct the aircraft to the desired landing destination. In various embodiments the aircraft controller is configured to begin sending the first set of command signals in response to determining the distance between the ejection seat and the aircraft is greater than the predetermined distance (i.e., after step 215).

In various embodiments, step 225 may include determining, by the aircraft controller, a current location of the aircraft; accessing, by the aircraft controller, a database comprising information for a plurality of landing locations; and determining, by the aircraft controller, the desired landing destination based on the current location of the aircraft, the information for the plurality of landing locations, and the data signals from the operational data source.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for controlling an aircraft in response to deployment of an ejection seat, the system comprising:

a seat controller located on the ejection seat and configured to output a signal in response to initiation of an ejection sequence;

an aircraft controller configured to receive the signal from the seat controller; and a first tangible, non-transitory memory configured to communicate with the aircraft controller, the first tangible, non-transitory memory having instructions stored thereon that, in response to execution by the aircraft controller, cause the aircraft controller to perform operations comprising:

receiving, by the aircraft controller, the signal from the seat controller, receiving, by the aircraft controller, data signals from an operational data source, sending, by the aircraft controller, a first set of command signals to a component of the aircraft; and determining, by the aircraft controller, if a distance between the ejection seat and the aircraft is greater than a predetermined distance, wherein the aircraft controller is configured to begin sending the first set of command signals in response to determining the distance between the ejection seat and the aircraft is greater than the predetermined distance.

2. The system of claim 1, wherein the operations further comprise determining, by the aircraft controller, a desired landing destination.

3. The system of claim 2, wherein determining, by the aircraft controller, the desired landing destination comprises:

determining, by the aircraft controller, a current location of the aircraft;

accessing, by the aircraft controller, a database comprising information for a plurality of landing locations; and determining, by the aircraft controller, the desired landing destination based on the current location of the aircraft, the information for the plurality of landing locations, and the data signals from the operational data source.

4. The system of claim 3, wherein the first set of command signals are configured to stabilize the aircraft.

5. The system of claim 4, wherein the operations further comprising sending, by the aircraft controller, a second set of commands to the component of the aircraft, wherein the second set of commands are configured to direct the aircraft to the desired landing destination.

6. The system of claim 2, wherein the operations further comprise determining, by the aircraft controller, if a distance between the ejection seat and the aircraft is greater than a predetermined distance, wherein the aircraft controller is configured to begin sending the first set of command signals in response to determining the distance between the ejection seat and the aircraft is greater than the predetermined distance.

7. The system of claim 1, wherein determining, by the aircraft controller, if the distance between the ejection seat and the aircraft is greater than the predetermined distance comprises outputting, by the aircraft controller, a plurality of wireless ping signals.

8. The system of claim 1, wherein determining, by the aircraft controller, if the distance between the ejection seat and the aircraft is greater than the predetermined distance comprises detecting, by the aircraft controller, severance of a cord connected to the ejection seat and the aircraft.

9. The system of claim 2, wherein the aircraft controller is configured to send the first set of command signals a predetermined time delay after receiving the signal from the seat controller.

10. The system of claim 1, further comprising a second tangible, non-transitory memory configured to communicate with the seat controller, the second tangible, non-transitory memory having second instructions stored thereon that, in response to execution by the seat controller, cause the seat controller to perform second operations comprising:

receiving, by the seat controller, a sequence initiation signal; and outputting, by the seat controller, the signal to the aircraft controller in response to receiving the sequence initiation signal.

11. The system of claim 10, wherein the sequence initiation signal is output in response to actuation of a rail switch.

12. A ejection system, comprising:

an ejection seat configured to be expelled from an aircraft;

a seat controller coupled to the ejection seat and configured to output a signal in response to initiation of an ejection sequence; and an aircraft controller configured to receive the signal from the seat controller, wherein the aircraft controller is configured to control the aircraft in response to receiving the signal from the seat controller, wherein the aircraft controller is configured to determine if a distance between the ejection seat and the aircraft is greater than a predetermined distance and wherein the aircraft controller is configured to begin sending command signals configured to control a component of the aircraft in response to determining the distance between the ejection seat and the aircraft is greater than the predetermined distance.

13. The ejection system of claim 12, further comprising:

a drogue coupled to the ejection seat;

a main parachute configured to deploy from the ejection seat; and an ejection sequencer operationally coupled to the drogue and the main parachute, wherein the ejection sequencer includes the seat controller, and wherein the seat controller is configured to control a deployment sequence for the drogue and the main parachute.

14. The ejection system of claim 12, wherein the aircraft controller is configured to determine if a distance between the ejection seat and the aircraft is greater than a predetermined distance, and wherein the aircraft controller is configured to begin sending command signals configured to control a component of the aircraft in response to determining the distance between the ejection seat and the aircraft is greater than the predetermined distance.

15. A method for controlling an aircraft after deployment of an ejection seat from the aircraft, the method comprising:

receiving, by an aircraft controller, a signal from a seat controller coupled to the ejection seat;

receiving, by the aircraft controller, data signals from an operational data source, the operational data source being configured to monitor at least one of an engine operating condition, an aircraft operating condition, or a flight parameter; and sending, by the aircraft controller, a first set of command signals to a component of the aircraft, the first set of command signals being configured to control at least one of the engine operating condition or the aircraft operating condition.

16. The method of claim 15, further comprising determining, by the aircraft controller, a desired landing destination.

17. The method of claim 16, wherein determining, by the aircraft controller, the desired landing destination comprises:

determining, by the aircraft controller, a current location of the aircraft;

accessing, by the aircraft controller, a database comprising information for a plurality of landing locations; and determining, by the aircraft controller, the desired landing destination based on the current location of the aircraft, the information for the plurality of landing locations, and the data signals from the operational data source.

18. The method of claim 16, further comprising sending, by the aircraft controller, a second set of commands to the component of the aircraft, wherein the first set of command signals are configured to stabilize the aircraft, and wherein the second set of commands are configured to direct the aircraft to the desired landing destination.

19. The method of claim 15, further comprising determining, by the aircraft controller, if a distance between the ejection seat and the aircraft is greater than a predetermined distance, wherein the aircraft controller is configured to begin sending the first set of command signals in response to determining the distance between the ejection seat and the aircraft is greater than the predetermined distance.

20. The method of claim 15, further comprising:

receiving, by the seat controller, a sequence initiation signal, wherein the sequence initiation signal is output in response to actuation of a rail switch; and outputting, by the seat controller, the signal to the aircraft controller in response to receiving the sequence initiation signal.

* * * * *